US010303588B2

(12) United States Patent
Lee et al.

(10) Patent No.: US 10,303,588 B2
(45) Date of Patent: May 28, 2019

(54) SYSTEMS AND METHODS FOR TEST BOOTING A DEVICE

(71) Applicant: SAMSUNG ELECTRONICS CO., LTD., Suwon-si, Gyeonggi-do (KR)

(72) Inventors: Byeong-hu Lee, Suwon-si (KR); Byeong-kuk Kim, Suwon-si (KR); Taek-gyun Kim, Suwon-si (KR); Yong-hee Park, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 209 days.

(21) Appl. No.: 15/162,843

(22) Filed: May 24, 2016

(65) Prior Publication Data
US 2016/0350131 A1  Dec. 1, 2016

(30) Foreign Application Priority Data
May 26, 2015  (KR) .................. 10-2015-0073093

(51) Int. Cl.
G06F 9/00 (2006.01)
G06F 15/177 (2006.01)
G06F 11/36 (2006.01)
G06F 9/4401 (2018.01)
(Continued)

(52) U.S. Cl.
CPC ........ *G06F 11/3688* (2013.01); *G06F 9/4401* (2013.01); *G06F 9/4406* (2013.01); *G06F 11/2284* (2013.01); *G06F 12/0875* (2013.01); *G06F 2212/452* (2013.01)

(58) Field of Classification Search
None
See application file for complete search history.

(56) References Cited

U.S. PATENT DOCUMENTS 5,511,202 A * 4/1996 Combs .................. G06F 9/4418
710/261
6,418,541 B1 * 7/2002 Jeon ...................... G06F 9/4406
709/222
(Continued)

FOREIGN PATENT DOCUMENTS

JP  2004-046453   2/2004
JP  2005-322074  11/2005
(Continued)

OTHER PUBLICATIONS

Search Report and Written Opinion dated Aug. 30, 2016 in counterpart International Patent Application No. PCT/KR2016/005463.
(Continued)

*Primary Examiner* — Nitin C Patel
(74) *Attorney, Agent, or Firm* — Nixon & Vanderhye, P.C.

(57) ABSTRACT

A device is provide including: a storage device comprising a memory configured to store configuration data used for test booting for a process of testing the device, before the test booting; and a controller configured to perform the test booting using the stored configuration data when receiving a start signal of the test booting, to control the process of testing the device to be performed after the test booting, and to delete the configuration data stored in the storage device when a completion signal of the process of testing the device is received.

11 Claims, 4 Drawing Sheets

(51) Int. Cl.
*G06F 11/22* (2006.01)
*G06F 12/0875* (2016.01)

(56) References Cited

U.S. PATENT DOCUMENTS

| | | | |
|---|---|---|---|
| 6,807,665 B2 * | 10/2004 | Evans | G06F 8/64 |
| | | | 717/175 |
| 7,096,351 B2 | 8/2006 | Kondo | |
| 8,214,189 B2 | 7/2012 | Kato et al. | |
| 8,316,200 B2 * | 11/2012 | Matsuoka | G06F 12/1433 |
| | | | 711/163 |
| 9,317,209 B2 | 4/2016 | Kirshenbaum et al. | |
| 2002/0166061 A1 * | 11/2002 | Falik | G06F 12/1425 |
| | | | 726/34 |
| 2004/0015671 A1 | 1/2004 | Kondo | |
| 2005/0289289 A1 | 12/2005 | Chang | |
| 2010/0162047 A1 * | 6/2010 | Haley | G06F 11/3688 |
| | | | 714/37 |
| 2013/0086372 A1 | 4/2013 | Kojo | |
| 2013/0198314 A1 | 8/2013 | Quere et al. | |
| 2013/0326112 A1 | 12/2013 | Park et al. | |
| 2015/0113212 A1 | 4/2015 | Hiratsuka et al. | |

FOREIGN PATENT DOCUMENTS

| | | |
|---|---|---|
| KR | 10-0986784 | 10/2010 |
| KR | 10-1246982 | 3/2013 |
| KR | 10-1281971 | 7/2013 |
| KR | 10-2013-0093506 | 8/2013 |
| KR | 10-2013-0134918 | 12/2013 |
| KR | 10-1335792 | 12/2013 |
| KR | 10-1436442 | 9/2014 |
| WO | 2004/107168 | 12/2004 |

OTHER PUBLICATIONS

Office Action dated Feb. 13, 2019 in counterpart Korean Patent Application No. 10-2015-0073093 and English-language translation thereof.

* cited by examiner

SYSTEMS AND METHODS FOR TEST BOOTING A DEVICE

CROSS-REFERENCE TO RELATED APPLICATION

This application is based on and claims priority under 35 U.S.C. § 119 to Korean Patent Application No. 10-2015-0073093, filed on May 26, 2015, in the Korean Intellectual Property Office, the disclosure of which is incorporated by reference herein in its entirety.

BACKGROUND

1. Field

The present disclosure relates to a booting device and an operating method thereof, and for example, to a device capable of performing test booting at high speed and an operating method thereof.

2. Description of Related Art

Recently, many functions of electronic products have been shifted from hardware to software. As software provides various functions, a capacity of software has increased, and processing of software has become more complicated. For initial booting of electronic products having more various functions, such as digital televisions, mobile communication terminals, playing devices, etc., a long initialization time is needed. Accordingly, it takes a significant amount of time to boot the electronic product, during a test process for determining whether an electronic product is normally operating or not.

SUMMARY

A device capable of performing test booting for a test process of a device, at high speed, and an operating method thereof are provided.

Additional aspects will be set forth in part in the description which follows and, in part, will be apparent from the description.

According to an aspect of an example embodiment, a device includes: a storage device comprising a memory configured to store configuration data used for test booting for a process of testing the device, before the test booting; and a controller configured to perform the test booting using the stored configuration data when receiving a start signal of the test booting, to control the process of testing the device to be performed after the test booting, and to delete the configuration data stored in the storage device when a completion signal of the process of testing the device is received.

The configuration data may include one or more of data that sets user configuration values of the device, as a random value, and cache data used to execute an operating system or an application installed in the device.

The storage device may further be configured to store the configuration data in a read/write area of a nonvolatile memory.

The storage device may further be configured to store a process flag indicating initial booting of the device, before the test booting.

The controller may further be configured to control the test booting to be performed, when the process flag is stored in the storage device.

The controller may further be configured to delete the process flag stored in the storage device, when the completion signal of the process of testing the device is received.

The controller may further be configured to generate one or more of user configuration data and cache data corresponding to the configuration data, during initial booting of a user of the device, and to store the generated one or more of the user configuration data and the cache data in the storage device.

The controller may further be configured to load the one or more of the user configuration data and the cache data stored in the storage device and to use the loaded one or more of the user configuration data and the cache data to boot the device, during booting of the device after the initial booting.

According to an aspect of another example embodiment, a method of operating a device includes: storing configuration data used for test booting for a process of testing the device, before the test booting; performing the test booting using the stored configuration data when receiving a start signal of the test booting; controlling the process of testing the device to be performed after the test booting; and deleting the configuration data when a completion signal of the process of testing the device is received.

The storing of the configuration data may include storing the configuration data in a read/write area of a nonvolatile memory.

The storing of the configuration data may include storing a process flag indicating initial booting of the device, before the test booting.

The performing of the test booting may include: determining whether the process flag is stored in the device; and performing the test booting, when the process flag is stored in the device.

The deleting of the configuration data may include deleting the process flag stored in the device, when the completion signal of the process of testing the device is received.

The method may further include generating one or more of user configuration data and cache data corresponding to the configuration data, during initial booting of a user of the device; and storing the generated one or more of the user configuration data and the cache data.

The method may further include loading the stored one or more of the user configuration data and the cache data and using the loaded one or more of the user configuration data and the cache data to boot the device, during booting of the device after the initial booting.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
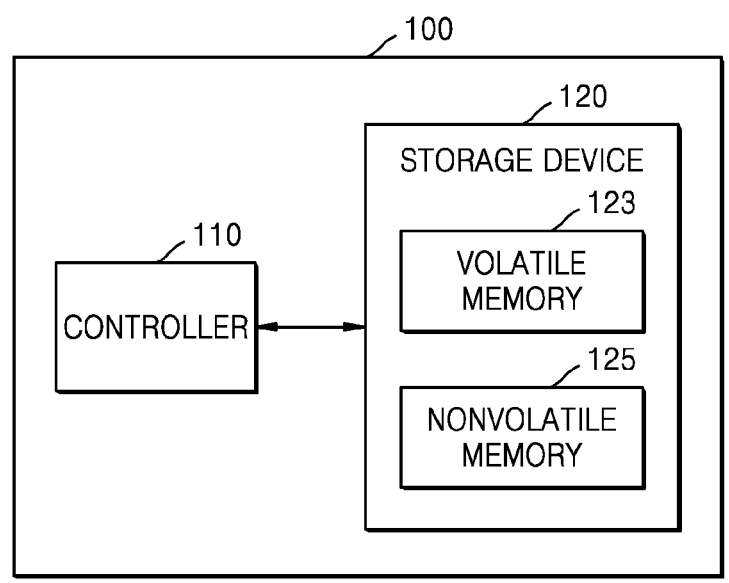
FIG. 1 is a block diagram illustrating an example structure of a device according to an example embodiment.

The terms used in the description will be described briefly and the disclosure will be described in greater detail.

The terms used in the disclosure may be selected from among common terms that are currently widely used in consideration of their function in the disclosure. However, the terms may be different according to an intention of one of ordinary skill in the art, a precedent, or the advent of new technology. Also, in particular cases, the terms may be arbitrarily selected, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the description, when a part "includes" an element, it is to be understood that the part may additionally include other elements rather than excluding other elements as long as there is no particular opposing recitation. Also, the terms such as " . . . unit," "module," or the like used in the present description indicate an unit, which processes at least one function or motion, and the unit may be implemented by hardware, firmware or software, or by a combination of hardware and software.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. Expressions such as "at least one of," when preceding a list of elements, modify the entire list of elements and do not modify the individual elements of the list.

FIG. 1 is a block diagram illustrating an example structure of a device 100.

The device 100 according to an example embodiment may be realized as various electronic devices, such as televisions (TVs), cellular phones, smart phones, digital cameras, camcorders, laptop computers, tablet personal computers (PCs), desk top computers, electronic book terminals, terminals for digital broadcasting, personal digital assistants (PDAs), portable multimedia players (PMPs), navigations, MP3 players, blue ray disk players, set top boxes, digital versatile disk (DVD) players, game players, wearable devices, etc. However, the device 100 is not limited thereto.

Referring to FIG. 1, the device 100 according to an example embodiment may include a controller (e.g., including processing circuitry) 110 and a storage device (e.g., including a memory) 120. The controller 110 according to an example embodiment may be configured to control general operations of the device 100. For example, the controller 110 may use data stored in the storage device 120 to execute an operating system (OS) and an application program installed in the device 100. The controller 110 may include a central processing unit (CPU).

Also, the controller 110 according to an example embodiment may control booting of the device 100. Booting refers to a process in which power is applied to the device 100 and the OS of the device 100 is loaded to a memory (e.g. random access memory (RAM)) of the device 100 to put the device 100 in an available state for use. In this specification, booting may include test booting that refers to initial booting of the device 100 for a process of testing the device 100 after production, and user booting that refers to booting of the device 100 via a user to use the device 100 after shipment of the device 100. However, the booting is not limited thereto.

The storage device 120 may include at least one memory and may store various data, programs, or applications to drive and control the device 100 under control of the controller 110. The storage device 120 may store signal data that is input/output in correspondence to driving of each of the components of the device 100. The storage device 120 may store a control program for controlling the device 100, an application initially provided by a manufacturer or downloaded from the outside, a graphic user interface (GUI) related to an application, an object (for example, an image text, an icon, a button, etc.) to provide the GUI, user information, documents, databases, or related data.

Also, the storage device 120 may include a volatile memory 123, a nonvolatile memory 125, a hard disk drive (HDD), or a solid state drive (SSD). The volatile memory 123 may read data related to an OS and an application program executed in the device 100 from the nonvolatile memory 125 and loads the read data so that the controller 110 may access the data related to the OS and the application program.

Also, the nonvolatile memory 125 is a device configured to store data to execute the OS and the application program of the device 100. The nonvolatile memory 125 is a storage medium in which the stored data is not deleted even if power supply is stopped. For example, the nonvolatile memory 125 may include NAND flash, NOR flash, etc.

The controller 110 according to an example embodiment may control generation of user configuration data or cache data during booting of the device 100 or while the device 100 operates. The user configuration data refers to data indicating information of a use environment of the device 100 that is set by the user. The controller 110 may set a use environment of the device 100 by receiving user information, during initial booting of the user of the device 100. For example, the controller 110 may set a language, a network, etc., used in the device 100, based on a user input.

Also, the device 100 may use the cache data when executing a computational operation, an OS, or an application program, in order to increase a speed of the computational operation, the OS, or the application program. The controller 110 may generate the cache data during the initial booting of the user.

For example, when the OS installed in the device 100 is Linux, the controller 110 may generate the cache data, during the initial booting of the user, by operating a tool, that is, prelink and extracting information. The prelink is a tool which is provided by the Linux and gathers and provides information of internal symbols of a dynamic library. Accordingly, when executing an application, the controller 110 may increase a speed of executing the application, by referring to the information of the prelink.

Also, the controller 110 may generate the cache data (front cache data) with respect to a font. Accordingly, when an application needing a font is executed, the font may be rapidly accessed. The controller 110 may generate various other types of cache data in addition to the cache data described above.

The controller 110 may store the user configuration data or the cache data in the nonvolatile memory 125. Accordingly, even when power supply to the device 100 is stopped, the user configuration data or the cache data may not be deleted. Also, the user configuration data or the cache data may be stored in a read/write area of the nonvolatile memory 125.

During next booting, the controller 110 may load the user configuration data or the cache data stored in the nonvolatile memory 125 and operate the device 100 according to the loaded user configuration data or cache data.

Meanwhile, the device 100 according to an example embodiment may store configuration data corresponding to the user configuration data or the cache data, in the storage device 120 before test booting. The configuration data may be data that sets configuration values that are set by a user, as random values during initial booting of the device 100. Alternatively, the configuration data may be cache data used to execute an OS or an application installed in the device 100. The configuration data may be pre-generated, and included in a specific area of a file (software) for mass production that is equipped in the device 100 to produce the device 100. The configuration data may be stored in the read/write area of the nonvolatile memory 125.

In the device 100 according to an example embodiment, the configuration data is pre-stored in the storage device 120, and thus, during the test booting for the test process of the device 100, the device 100 may not generate and store the user configuration data or the cache data. Accordingly, a speed of the test booting of the device 100 may be increased.

Figure 2:
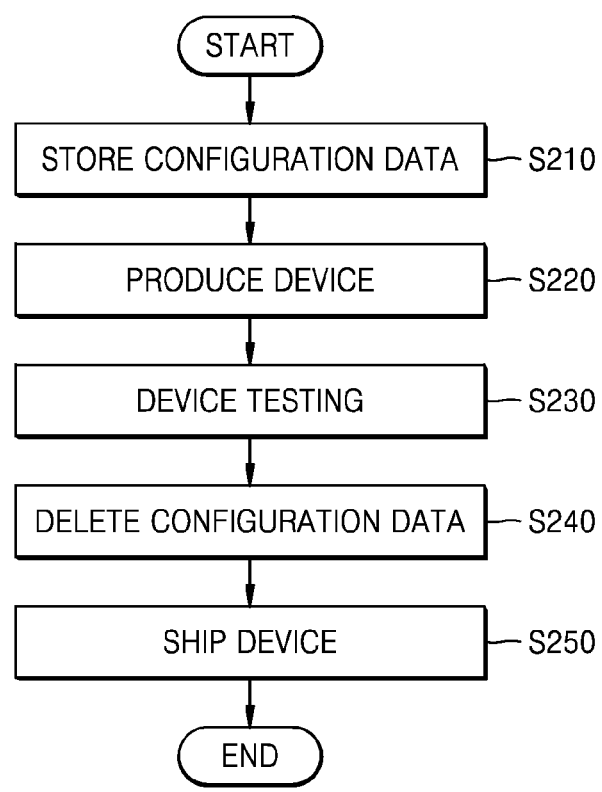
FIG. 2 is a flowchart illustrating an example process of producing a device, according to an example embodiment.

FIG. 2 is a flowchart illustrating an example process of producing the device 100, according to an example embodiment.

Referring to FIG. 2, the device 100 according to an example embodiment may store configuration data in operation S210.

The configuration data may be included in a specific area of a file (software) for mass production that is equipped in the device 100 to produce the device 100, and may be stored in the read/write area of the nonvolatile memory 125 of the device 100. Here, the configuration data may be data corresponding to the user configuration data or the cache data. The configuration data may be data that sets configuration values that are set by a user, as random values during initial booting of the device 100. Alternatively, the configuration data may be the cache data used to execute an OS or an application installed in the device 100.

Also, the device 100 may store a process flag indicating initial booting, together with the configuration data.

The process of producing the device 100 may be performed by using the file for mass production equipped in the device 100, in operation S220.

When the process of producing the device 100 is completed, a process of testing the device 100 may be performed in operation S230.

The process of testing the device 100 refers to a process in which whether the device 100 normally operates is determined, after a surface mounting technology (SMT) operation of the device 100 is completed. Here, test booting of the device 100 is performed for the test process of the device 100. The device 100 may start the test booting by receiving a test booting start signal. The device 100 according to an embodiment pre-stores the configuration data, and thus, during the test booting, the device 100 may not generate or store the user configuration data or the cache data. Accordingly, a speed of the test booting of the device 100 may be increased.

When the test process of the device 100 is completed, the device 100 may delete the configuration data in operation S240.

When the test process of the device 100 is completed, the device 100 may receive a test process completion signal. Since the configuration data is stored in the nonvolatile memory 125 of the device 100, the configuration data is not deleted even when power supply to the device 100 is stopped. Thus, if the configuration data is not deleted, a malfunction may occur during the initial booting of the user after shipment of the device 100, due to temporary data stored in the nonvolatile memory 125. Thus, the device 100 may delete the configuration data when receiving the test process completion signal. Thereafter, the device may be shipped in operation S250.

Figure 3:
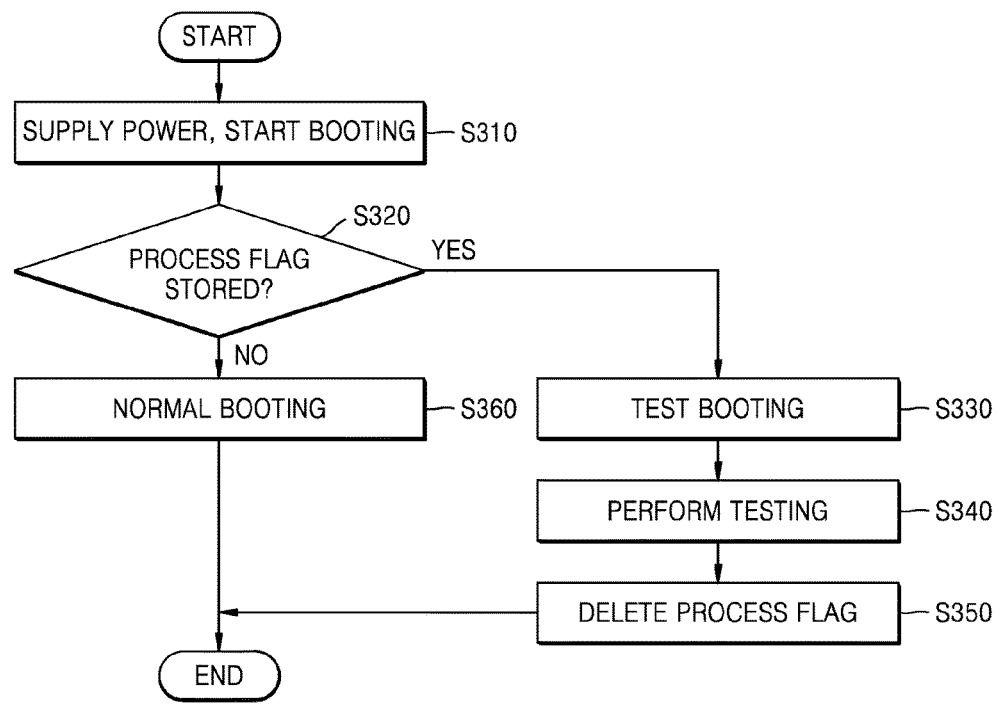
FIG. 3 is a flowchart illustrating an example method of booting a device based on whether there is a process flag or not, according to an example embodiment.

FIG. 3 is a flowchart illustrating an example method of booting the device 100 based on whether there is a process flag, according to an example embodiment.

Referring to FIG. 3, the device 100 may start booting when power is supplied, in operation S310. Here, booting refers to a process in which power is applied to the device 100 and an OS of the device 100 is loaded to a memory (e.g. RAM) of the device 100 to make the device 100 available for use.

The device 100 may determine whether there is the process flag in the storage device 120, in operation S320. Here, the process flag may be a flag indicating initial booting, and may be stored in a read/write area of the nonvolatile memory 125, together with temporary data, in operation S210 of FIG. 2.

When there is the process flag stored in the storage device 120, the device 100 may perform test booting in operation S330.

Test booting may refer to initial booting after the device 100 is produced, for testing the device 100. The device 100 according to an embodiment pre-stores the configuration data before the test booting, and thus, the device 100 may perform the test booting by using the configuration data, without generating the user configuration data or the cache data. For example, the configuration data may include data that sets configuration values that are set by a user, as random values during the initial booting of the device 100, or cache data used to execute an OS or an application installed in the device 100.

When there is the process flag, the device 100 may omit some operations included in the booting operation to increase the booting speed. For example, a process of identifying an update of the configuration data may be omitted.

When the test booting of the device 100 is completed, the test process of the device 100 may be performed in operation S340. The test process of the device 100 refers to a process in which whether the device 100 normally operates is determined after an SMT operation of the device 100 is completed.

After the test process is completed, the device 100 may delete the process flag stored in the nonvolatile memory 125 in operation S350. Also, the device 100 may delete the configuration data stored in the nonvolatile memory 125.

Meanwhile, the device 100 may perform normal booting in operation S360, when the process flag is not stored in the storage device 120 (S320).

Normal booting refers to booting, which is not the test booting. The normal booting may include booting which is not the initial booting when the test process is performed, or user booting performed by the user of the device 100. As described above, the configuration data is deleted after the test process, and thus, during the normal booting according to an embodiment, the device 100 generates the user configuration data or the cache data. The normal booting will be described in detail with reference to FIG. 4.

Figure 4:
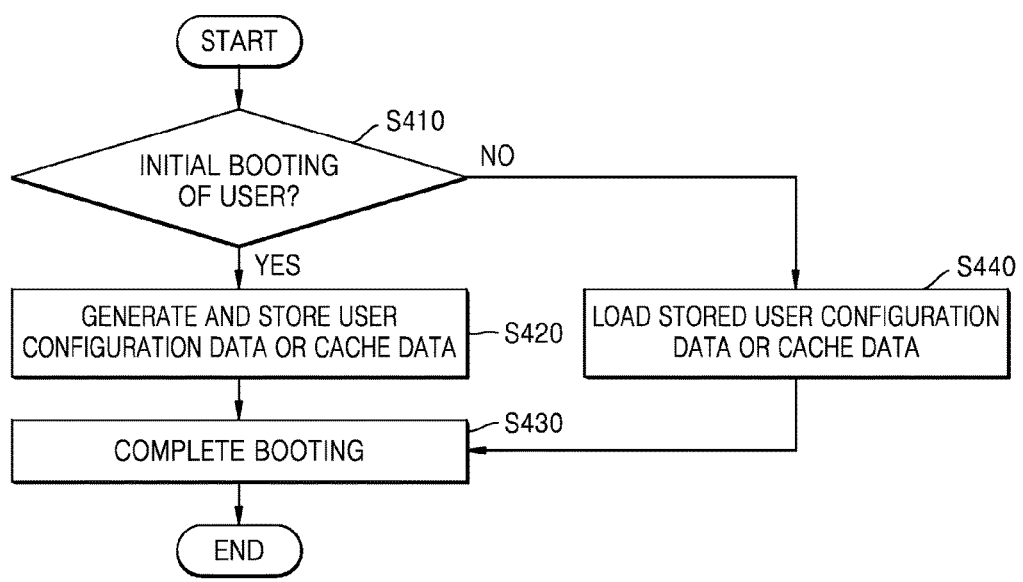
FIG. 4 is a flowchart illustrating an example normal booting method of a device, according to an example embodiment.

FIG. 4 is a flowchart illustrating an example normal booting method of the device 100, according to an example embodiment.

Referring to FIG. 4, the device 100 may start booting when power is applied to the device 100. When the booting is started, the device 100 may determine whether the booting is initial booting of a user of the device 100 in operation S410. For example, the device 100 may determine that the booting is the initial booting of the user, when the user configuration data or the cache data is not stored in the nonvolatile memory 125.

When the booting is the initial booting of the user, the device 100 may generate the user configuration data or the cache data during the booting, and store the generated user configuration data or cache data in a read/write area of the nonvolatile memory 125 in operation S420.

The user configuration data refers to data indicating information of a use environment of the device 100 that is set by the user. The device 100 may set the use environment of the device 100 by receiving user information, during the initial booting of the user. For example, the device 100 may set a language, a network, etc. used in the device 100, based on a user input. Also, the device 100 may generate the cache data and use the generated cache data to increase an execution speed of a computational operation, an OS, or an application program.

When the booting of the device 100 is completed in operation S430, the device 100 may execute the OS and the application.

Meanwhile, when the user configuration information file or the cache data is stored in the nonvolatile memory 125, the device 100 may determine that the booting is not the initial booting of the user.

When the booting is not the initial booting of the user, the device 100 may load the user configuration data or the cache data stored in the nonvolatile memory 125, during the booting, in operation S440.

The device 100 may use the user configuration data loaded from the nonvolatile memory 125 to set the use environment of the device 100, and may use the cache data to execute the application.

As described above, the device according to the one or more of the above example embodiments may store the user configuration data or the cache data before test booting, in order to increase a booting speed during the test booting.

The method disclosed may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the various example embodiments or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that the example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A device comprising:
    a storage comprising a memory configured to store configuration data and a flag associated with test booting of the device; and
    a controller configured to:
        in response to a signal for booting of the device being received, perform the test booting for a process of testing operation of the device using the stored configuration data when the flag exists in the storage;
        control the process of testing the operation of the device after the test booting;
        in response to a signal indicating completion of the process of testing the operation of the device being received, delete the configuration data and the flag stored in the storage,
    wherein the controller is further configured to perform, in response to the signal for booting of the device being received, a normal booting different from the test booting when the flag does not exist in the storage.

2. The device of claim 1, wherein the configuration data comprises one or more of data for setting user configuration values of the device as random values, and cache data for executing an operating system or an application installed in the device.

3. The device of claim 1, wherein the configuration data is stored in a read/write area of a nonvolatile memory of the storage.

4. The device of claim 1, wherein the controller is configured to generate one or more of user configuration data and cache data corresponding to the configuration data, during the normal booting of the device, and store the generated one or more of the user configuration data and the cache data in the storage.

5. The device of claim 4, wherein the controller is configured to load the one or more of the user configuration data and the cache data stored in the storage and use the loaded one or more of the user configuration data and the cache data, during user booting of the device subsequent to the normal booting.

6. A method of operating a device, the method comprising:
    storing configuration data and a flag associated with test booting of the device in a storage;
    in response to a signal for booting of the device being received, performing the test booting for a process of testing operation of the device using the stored configuration data when the flag exists in the storage;
    controlling the process of testing the operation of the device after the test booting;
    in response to a signal indicating completion of the process of testing the operation of the device being received, deleting the configuration data and the flag stored in the storage; and
    performing, in response to the signal for booting of the device being received, a normal booting different from the test booting when the flag does not exist in the storage.

7. The method of claim 6, wherein the configuration data comprises one or more of data for setting user configuration values of the device as random values, and cache data for executing an operating system or an application installed in the device.

8. The operating method of claim 6, wherein the storing of the configuration data comprises storing the configuration data in a read/write area of a nonvolatile memory of the storage.

9. The operating method of claim 6, further comprising:
generating one or more of user configuration data and cache data corresponding to the configuration data, during the normal booting of the device; and
storing, in the storage, the generated one or more of the user configuration data and the cache data.

10. The operating method of claim 9, further comprising:
loading the stored one or more of the user configuration data and the cache data and using the loaded one or more of the user configuration data and the cache data, during user booting of the device subsequent to the normal booting.

11. A non-transitory computer-readable recording medium having recorded thereon a computer program which, when executed by a processor of a device, causes the device to perform:
storing configuration data and a flag associated with test booting of the device in a storage of the device;
in response to a signal for booting of the device being received, performing the test booting for a process of testing operation of the device using the stored configuration data when the flag exists in the storage;
controlling the process of testing the operation of the device after the test booting;
in response to a signal indicating completion of the process of testing the operation of the device being received, deleting the configuration data and the flag stored in the storage; and
performing, in response to the signal for booting of the device being received, a normal booting different from the test booting when the flag does not exist in the storage.

\* \* \* \* \*